S. Marsh,
Grain Ventilator,
N° 30,486. Patented Oct. 23, 1860.
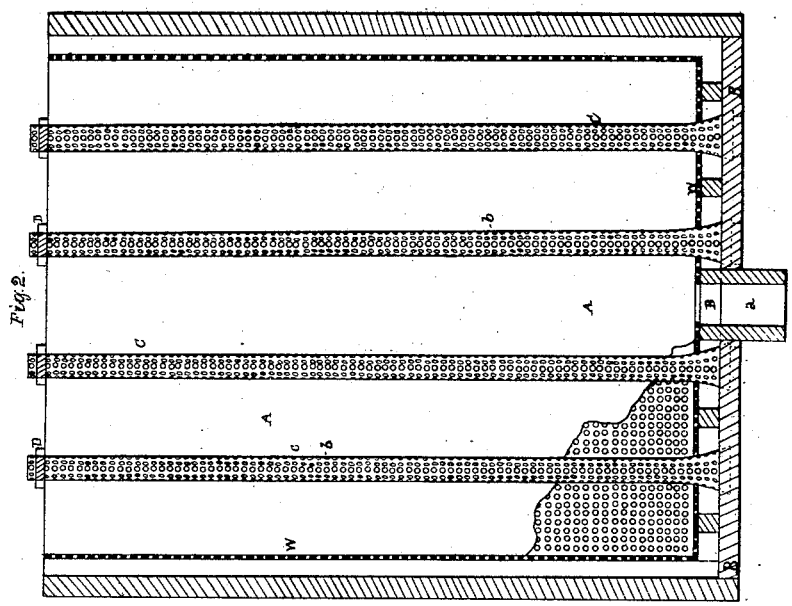
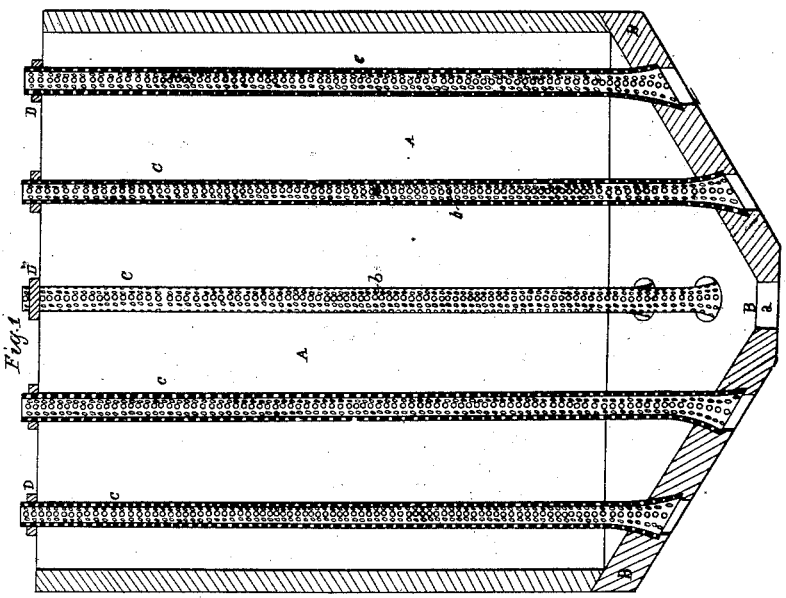
Witnesses
Wm H. Harrison
W. Fairfax
Inventor
Sylvester Marsh by
A. Pollak his atty

UNITED STATES PATENT OFFICE.

SYLVESTER MARSH, OF ROXBURY, MASSACHUSETTS.

GRAIN-BIN.

Specification of Letters Patent No. 30,486, dated October 23, 1860.

*To all whom it may concern:*

Be it known that I, SYLVESTER MARSH, of Roxbury, in the county of Norfolk and State of Massachusetts, have invented a certain new and useful Improvement in Grain-Bins, of which the following is a full and exact description, reference being had to the accompanying drawing, which forms part of this specification.

My invention has reference to an economical mode of storing cereals or grain, so as to effectually preserve them from decay.

It is well understood that grain of any kind may be easily preserved sound and in a healthy condition for a considerable period, if put up in a dry state, by storing it in rooms inaccessible to wet or moisture, or by exposing it to free circulation of atmospheric air. This is not attainable by the ordinary method of storing grain, since however much dried before storing away, it invariably contains a certain quantity of moisture absorbed by it from the atmosphere, and the ventilation of it afterward when stored away, has been at best but imperfectly effected. Both forced and natural currents of atmospheric air have been used or resorted to, for keeping up a supply of fresh air to and through the stored grain for the purpose of preserving it, in a measure, from decay, but this has previously been so imperfectly attained that no plan has heretofore been found superior to that in which the grain has been deposited in thin layers and stirred occasionally or removed at intervals from one room to another—a process which is not only expensive by reason of the labor involved and large amount of storage room required, but which even then secured to the grain only imperfect ventilation or atmospheric exposure, so as to remove the destructive effects of moisture upon it. The many well-known forms of grain driers and kilns, which use an artificially heated current of air, and in many of which the grain is not allowed to stand but simply run through them, are, of course, unsuitable to the present purpose of storing grain.

The nature and object of my invention then is the construction of a bin in which not only is space economized and all manual labor of stirring or removing the grain from time to time, avoided, but whereby, from the peculiar manner of arranging the space that holds the grain and air passages or ducts, constant currents of air will be made to pass through and around the grain and the ventilation of it, be more perfectly secured than has heretofore been accomplished.

To enable others to make and use my improvement, I will now proceed to describe it in detail.

In the accompanying drawing, Figures 1 and 2, represent vertical sections through the center line of a bin constructed according to my improvement.

The shape of the bin or of the compartments forming it, may be varied, but it is here shown as made of a quadrangular box (A) open at the top and provided with a flat or funnel shaped bottom (B), as respectively seen in Figs. 1, and 2. In the middle of the bottom (B) is formed an opening (*a*) which should be provided with a slide or valve for the purpose of removing the grain from the bin. The bottom (B) is also provided with a series of holes into which are fitted the lower ends of a number of tubes (C) the upper ends of which are held in position by a frame work (D) arranged for that purpose at the top of the bin. These tubes, which are open, at both ends, are made either of wire gauze or of thin metallic sheets punched or perforated with numerous holes (*b*) of a size too small to allow the grain to pass through or obstruct them, but sufficiently large and numerous to allow of currents of air to enter from them and pervade the whole mass of grain. Said tubes may be made funnel shaped at their lower extremities for the double purpose of enlarging the area of their receiving ends and of affording more perfect means for securing them in their places.

To insure a thorough circulation not only through the mass of grain but also around it, the bin is provided with double side walls, leaving a free space between them for the passage of a current of air, the inner sides (W) being formed of metallic sheets perforated with holes in a like manner as the tubes (C).

From the foregoing description it will be readily perceived that, by this arrangement, a full, continuous and thorough ventilation of the grain will be always secured so that there will be no danger either of the grain becoming heated or of moisture remaining confined long enough to deteriorate the quality of the grain.

The perforated air tubes (C) it will be seen, do not confine or divide the mass of grain, as partitions or walls run across the bin would do and which would virtually make of one bin several without intermediate air ducts, but they penetrate and divide the whole mass of grain at frequent points without separating into distinct lots or confining the body of grain; thus they prevent any accumulation in body or bulk of the grain free from exposure to atmospheric air, and permit of free and open contact of the grain throughout the whole mass or body of it in the bin, which largely serves to equalize the ventilation of the whole.

Of course the inner perforated side walls (W), acting in concert with the tubes (C) materially assist in effecting perfect and thorough ventilation, the fullest effect being produced by such combination.

As before observed, the shape and size of the compartments or bins may be varied at pleasure or as circumstances suggest; thus, the bins may be angular, round or oval shaped, small and portable, or large and removable, or be made to form a permanent structure or granary.

Having thus described my improvement, what I claim as new, and desire to secure by Letters Patent, is—

The arrangement in grain bins of suitable form and otherwise ordinary construction of a series of perforated tubes open at both ends, secured to and inserted in corresponding holes in the bottom of said bins, so that external air may penetrate and pervade the whole mass or body of grain substantially in the manner and for the purposes herein set forth.

In testimony whereof I have signed my name to this specification before two subscribing witnesses.

SYLVESTER MARSH.

Witnesses:
 ALBERT W. BROWN,
 FREDERIC A. SAYER.